United States Patent Office 3,294,533
Patented Dec. 27, 1966

3,294,533
PRESENSITIZED PRINTING PLATE AND PROCESS
OF DEVELOPING PRINTING PLATE
Oskar Süs, Wiesbaden-Biebrich, and Hartmut Steppan,
Wiesbaden-Dotzheim, Germany, assignors, by mesne
assignments, to Azoplate Corporation, Murray Hill,
N.J.
No Drawing. Filed Apr. 29, 1963, Ser. No. 276,210
Claims priority, application Germany, May 2, 1962,
K 46,628
16 Claims. (Cl. 96—33)

Higher molecular weight diazo compounds, e.g. those obtained by acid condensation of diphenylamine-4-diazonium sulfate with formaldehyde, are known to the art.

Upon exposure to light of layers that have been sensitized with diazo compounds of this type, which are soluble in water or other solvents, oleophilic higher molecular weight products are formed in the exposed areas while in the unexposed areas the layer containing the soluble diazo compounds can be removed with a suitable solvent treatment. If the layer is applied to a suitable support, e.g. of metal, paper or superficially saponified cellulose acetate, the hydrophilic support is bared by the removal of the unexposed areas of the layer, so that a negative printing plate is obtained from a positive master.

Material hitherto available, in which such compounds were used, deteriorates in storage. However, good storage qualities, even under adverse conditions, are of great importance for practical purposes.

In order to increase the stability of the light sensitive layers produced with these diazo compounds, two different methods have been adopted: in one method, an increase in stability is obtained by a pretreatment of the support, e.g. aluminum, with silicates or a polyacrylic acid. In the other method, the diazo compounds are converted into more stable compounds by suitable methods of precipitation before applying them to the support to be coated, e.g. condensation products of diphenylamine-4-diazonium sulfate and formaldehyde are separated in the form of their zinc chloride or cadmium chloride salts and used in this form. These complex compounds are more stable than the corresponding diazonium halides.

Now it has been found that, as compared to known reproduction materials having non-metallic supports, considerably improved storage properties are possessed by a copying material the light-sensitive layer of which is supported on a non-metallic base, e.g. support consisting wholly or partially of cellulose, cellulose derivatives, or plastic material, and contains at least one polyfunctional substituted or unsubstituted diaphenylamine-4-diazonium salts with formaldehyde or other aldehyde or a ketone, in the form of the hexafluophosphate. Because the condensation products obtained with formaldehyde are more easily prepared and more readily soluble, formaldehyde is preferably used in the condensation reaction.

Since the hexafluophosphates are only slightly soluble in water, the compounds are obtainable in high yields and in excellent purity. They dissolve readily in a number of organic solvents. The zinc chloride double salts and cadmium chloride double slats of the same condensation products, however, are only slightly soluble in organic solvents.

Substituents which may be linked to the phenyl nuclei of the diphenylamine-4-diazonium compounds are, e.g.: alkyl and alkoxy groups, particularly such having 1 to 6 carbon atoms, further halides and the following groups:

Carboxy (—COOH)
Carboxylic ester (—COOR) (R=alkyl or aryl)
Carbonamide (—CONH$_2$)
Cyan (—CN)
Acyl (—COR) (R=alkyl or aryl)
Alkoxy sulfonyl (—SO$_3$—R) (R=alkyl)
Aryloxy sulfonyl (—SO$_3$—R) (R=aryl)
Acylamino (—NHCOR) (R=alkyl or aryl)
Alkylamino (—NHR and NR$_2$) (R=alkyl)
Arylamino (—NHR and NR$_2$) (R=aryl)
Sulfo (—SO$_3$H)

Examples of such substituents which may be linked to the phenyl nuclei of the diphenyldiazonium groups are: methyl, ethyl, propyl, butyl, isobutyl, methoxy, ethoxy, fluorine, chlorine, bromine, iodine, ethoxy carbonyl, phenoxy carbonyl acetyl, methoxy sulfonyl, ethoxy sulfonyl, acetamino, methylamino, ethylamino, dimethylamino, diethylamino, methylethylamino, phenylamino, benzylamino, methylbenzylamino, and ethylbenzylamino.

The diphenylamine-4-diazonium salts used to make the condensation products may be derived, for example, from the following amines:

4 - amino - diphenylamine, 4 - amino - 3 - methoxydiphenylamine, 4 - amino - 2 - methoxy - diphenylamine, 4' - amino - 2 - methoxy - diphenylamine, 4' - amino - 4-methoxydiphenylamine, 4 - amino - 3 - methyl - diphenylamine, 4 - amino - 3 - ethyldiphenylamine, 4' - amino - 3-methyldiphenylamine, 4' - amino - 4 - methyldiphenylamine, 4 - amino - 3 - ethoxydiphenylamine, 4 - amino-3 - hexyloxydiphenylamine, 4' - amino - 6 - methoxy - 3-methyldiphenylamine, 4 - amino - 6 - methoxy - 3 - methyldiphenylamine, 4' - amino - 3,3' - dimethyl - diphenylamine, 3' - chloro - 4 - aminodiphenylamine, 4 - amino-2,5 - diethoxydiphenylamine, 4' - amino - 4 - n - butoxydiphenylamine, and 4' - amino - 4,3' - dimethoxydiphenylamine.

Aliphatic, aromatic, mixed aliphatic/aromatic and heterocyclic aldehydes and ketones may be used as the active carbonyl compounds. The aldehyde or ketone may also contain unsaturated linkages. Preferred aliphatic compounds are those containing 1 to 11 carbon atoms in the molecule and preferred aromatic and mixed aliphatic/aromatic compounds are those containing 7 to 13 carbon atoms in the molecule. The best results are generally obtained with condensation products in which formaldehyde is the sole or at least one of the active carbonyl compounds reacted with the diazonium salt. However, condensation products with other active carbonyl compounds, e.g. acetaldehyde, isobutyraldehyde, benzaldehyde, benzaldehyde-3-sulfonic acid, chloral, acetone, butanone, di-isobutylketone, acetophenone, benzophenone, benzil, pyroracemic acid, cinnamaldehyde, naphthalene - 1 - aldehyde, phenanthreno - quinone - sulfonic acid, pyridine - 3 - aldehyde, and quinoline - 4-aldehyde, or mixtures of such compounds, can also be used.

For coating on a support, the hexafluophosphates are dissolved in an organic solvent, preferably in such a solvent having a boiling point between 80 and 150° C. Suitable solvents are, e.g. aliphatic ketones and monoand polyvalent alcohols which may be partially etherified. The monoethers of glycols, e.g. glycol monomethylether and glycol monoethylether, as well as dimethyl formamide and diozane have proved very suitable. In some cases, it was found to be of advantage to add water to the solvents.

The solutions thus obtained are applied to the supports in known manner, e.g. by application with a cotton pad or on a whirl coater. For the preparation of a printing plate, the copying material is exposed to light under a master and then developed by wiping over with a suitable developer solution. In general, tap water, with no chemicals added, may be used for developing the image to a finished printing plate. In some cases particularly if paper is used as the base material, development is advantageously effected using aqueous solutions of gum arabic, which may contain one or more organic solvents. The printing plates thus prepared will yield a large number of flawless prints in conventional offset printing machines.

In the following examples, 1 ml. is the unit of volume when 1 gram is the unit of weight.

*Example 1*

0.5 part by weight of the diazo compound, prepared as described below, was dissolved in 100 parts of glycol monomethylether. By means of a whirl coater, this solution was coated onto a superficially saponified cellulose acetate foil which had been laminated to a paper base. The solution was briefly dried by means of a current of warm air and then, for complete removal of the solvent, further dried for about 2 minutes at 100° C.

The sensitized material thus obtained possessed considerably improved storageability as compared with a similar material which had been sensitized with the zinc chloride double salt of the diazo compound, or other hitherto used derivative of this compound.

If the sensitized foil thus obtained is exposed for 1 to 2 minutes under a negative film master, using a carbon arc lamp of 18 amp. at a distance of 70 cm., a strongly blue colored positive image is obtained which may be developed with water and, without any acid treatment, inked up with greasy ink or immediately set up in a conventional printing press.

For the preparation of the diazo compound, a mixture of 346 parts by weight of diphenylamine-4-diazonium chloride and 50 parts by weight of paraformaldehyde was introduced, with stirring and at a bath temperature of about 40° C., into 375 parts by volume of 85 percent phosphoric acid. The mixture was agitated for two hours at a temperature of 40° C. and then further stirred for 22 hours, while the temperature was allowed to drop slowly to 20° C. The reaction product thus obtained was dissolved in 2250 parts by volume of water, filtered over charcoal, and then mixed with a solution, in 1800 parts by volume of water, of 900 parts by weight of an ammonium-hexafluophosphate obtained by melting ammonium fluoride and phosphorus pentachloride together. The precipitate which formed was filtered off, washed neutral with water, and dried. The yield was 360 parts by weight of a yellow powder which, for purification, was dissolved in glycol monomethylether, and, after filtration with charcoal, reprecipitated with water. The reaction product thus obtained had no definite melting point.

Instead of phosphoric acid, 80 percent sulfuric acid may be used in the condensation, the experimental conditions being the same. In this case, a reaction product is obtained which, in the form of its hexafluophosphate, is also suitable for the preparation of a reproduction material.

*Example 2*

A paper support, prepared as described in U.S. Patent No. 2,778,735, was coated with a solution containing 1 part by weight of the hexafluophosphate of a condensation product, the preparation of which is described below, dissolved in 100 parts by volume of glycol monomethyl ether. The coated layer was dried by means of a current of warm air and the copying material thus obtained had good storage properties.

The copying material thus obtained may be exposed to light in known manner under a master and development may be effected by wiping over with water or an aqueous gum arabic solution, which may also contain an organic solvent (e.g. glycol monomethyl ether). The printing plate thus obtained may be inked up either manually or by clamping it in a printing press. Numerous flawless prints may be obtained.

For the preparation of the condensation product, a mixture of 28.2 parts by weight of a 93 percent solution of 3 - methoxy - diphenyl - amine - 4 - diazonium chloride and 3.3 parts by weight of formaldehyde was introduced into 50 parts by volume of concentrated hydrochloric acid, condensation was effected for 5 hours at 40° C., and the condensation mixture was then allowed to stand overnight at room temperature. Subsequently, the mixture was diluted with 500 parts by volume of water, heated to 40° C., and then mixed with an approximately 1-molar aqueous solution of hexafluophosphoric acid. After cooling the precipitate was filtered, washed with water until the wash water was free of acid and chloride ions, and then dried. The yield was 20.3 parts by weight.

The paper support described in the U.S. patent consists of a coated paper provided with a calendered layer which layer consists essentially of a carboxy methyl hydroxy ethyl cellulose adhesive which was rendered insoluble and in which the ratio of carboxy methyl groups to hydroxy ethyl groups is in the range of 0.3 to 1 and the degree of substitution of the anhydro glucose units exceeds 0.8, and a larger quantity of nonaqueous pigment, viz. blanc fixe and/or titanium dioxide.

*Example 3*

A superficially saponified cellulose acetate foil was coated on a whirl coater with a solution which contained 1 g. of the condensation product, the preparation of which is described below, separated in the form of the hexafluophosphate, dissolved in 100 ml. of glycol monomethyl ether. The foil thus sensitized was dried in a current of warm air.

When using the copying material thus prepared, it is exposed, e.g., under a master, developed by wiping over with water or an equeous solution of gum arabic, to which some ethyleneglycol monomethylether may have been added, and finally inked up with greasy ink. A printing plate is thus obtained from which long runs can be printed.

For the preparation of the diazo compound, a mixture of 27.2 parts by weight of 4-methoxy-diphenylamine-4'-diazonium chloride and 3 parts by weight of paraformaldehyde was introduced into 50 parts by weight of a 65 per cent solution of hydrobromic acid and condensation was effected for 14 hours at 40° C. The condensation product thus obtained was converted into the hexafluophosphate as described in Example 2, and separated in this form.

*Example 4*

A superficially saponified cellulose acetate foil was coated with a solution which contained 1 part by weight of diazonium salt, prepared as described below and separated in the form of the hexafluophosphate, dissolved in 100 parts by volume of glycol monomethyl ether, and the foil was then dried. The printing plate thus obtained was exposed under a master, wiped over, for development, with an aqueous solution containing 2 percent of disodium phosphate (calculated as dodecahydrate) and 3 percent of ammonium chloride, and then inked up with greasy ink.

For the preparation of the diazo compound, 30.3 parts by weight of diphenylamine-4-diazonium sulfate (96.4 percent solution) were mixed with 100 parts by weight of 80 percent sulfuric acid, 9.7 parts by weight of pyroracemic acid were added to the mixture at room temperature, and the whole was first heated to 40° C. for two hours and then left standing overnight. In order to remove the bulk of the sulfuric acid, the solution was diluted with methanol and stirred into isopropanol. The precipitated diazonium sulfate was dissolved in a water-isopropanol mixture (80 percent water) and the desired diazonium hexafluophosphate was precipitated by adding aqueous hexafluophosphoric acid to the solution. The precipitate was washed with water until it was free of acid, and then dried.

*Example 5*

The procedure described in Example 2 was repeated. However, for coating the support a solution was used which contained 1 part by weight of the diazonium salt, the preparation of which is described in detail below, in 100 parts by volume of glycol monomethylether.

Development of the light-exposed printing plate may be effected with a mixture of equal parts by volume of 14 percent aqueous gum arabic solution and glycol monomethyl ether.

For the preparation of the diazonium salt, 5.9 parts by weight of a 92 percent diphenylamine-4-diazonium chloride solution were combined with 4.8 parts by weight of paraldehyde in 50 parts by volume of a 63 percent hydrobromic acid solution, and the mixture left standing overnight. The crude condensate was then evaporated to dryness at subatmospheric pressure at temperatures not exceeding 65° C. The residue was dissolved in a water-isopropanol mixture and the hexafluophosphate of the condensation product was precipitated by adding hexafluophosphoric acid to the solution. The precipitate was washed with water until it was free of acid and then dried.

It will be obvious to those skilled in the art that many modifications may be made within the scope of the present invention without departing from the spirit thereof, and the invention includes all such modifications.

What is claimed is:

1. A presensitized printing plate comprising a non-metallic base having a light sensitive layer thereon, the latter comprising the hexafluophosphate of at least one polyfunctional diazonium salt obtained by the acid condensation of a diphenylamine-4-diazonium salt with a compound selected from the group consisting of an aldehyde and a ketone, the layer containing substantially no excess of a strong acid.

2. A presensitized printing plate according to claim 1 in which the light sensitive layer comprises the hexafluophosphate of the condensation product of diphenylamine-4-diazonium chloride and paraformaldehyde.

3. A presensitized printing plate according to claim 1 in which the light sensitive layer comprises the hexafluophosphate of the condensation product of 3-methoxy-diphenylamine-4-diazonium chloride and formaldehyde.

4. A presensitized printing plate according to claim 1 in which the light sensitive layer comprises the hexafluophosphate of the condensation product of 4-methoxy-diphenylamine-4'-diazonium chloride and paraformaldehyde.

5. A presensitized printing plate according to claim 1 in which the light sensitive layer comprises the hexafluophosphate of the condensation product of diphenylamine-4-diazonium sulfate and pyroracemic acid.

6. A presensitized printing plate according to claim 1 in which the light sensitive layer comprises the hexafluophosphate of the condensation product of diphenylamine-4-diazonium chloride and paraldehyde.

7. A presensitized printing plate according to claim 1 in which the base is a superficially saponified cellulose acetate foil.

8. A presensitized printing plate according to claim 1 in which the base is paper.

9. A process for developing a printing plate which comprises exposing a light sensitive layer, on a non-metallic base, to light under a master and developing the resulting image by treatment with an aqueous developer, the light sensitive layer comprising the hexafluophosphate of at least one polyfunctional diazonium salt obtained by the acid condensation of a diphenylamine-4-diazonium salt with a compound selected from the group consisting of an aldehyde and a ketone, the layer containing substantially no excess of a strong acid.

10. A process according to claim 9 in which the light sensitive layer comprises the hexafluophosphate of the condensation product of diphenylamine - 4 - diazonium chloride and paraformaldehyde.

11. A process according to claim 9 in which the light sensitive layer comprises the hexafluophosphate of the condensation product of 3-methoxy-diphenylamine-4-diazonium chloride and formaldehyde.

12. A process according to claim 9 in which the light sensitive layer comprises the hexafluophosphate of the condensation product of 4-methoxy-diphenylamine-4'-diazonium chloride and paraformaldehyde.

13. A process according to claim 9 in which the light sensitive layer comprises the hexafluophosphate of the condensation product of diphenylamine-4-diazonium sulfate and pyroracemic acid.

14. A process according to claim 9 in which the light sensitive layer comprises the hexafluophosphate of the condensation product of diphenylamine-4-diazonium chloride and paraldehyde.

15. A process according to claim 9 in which the base is a superficially saponified cellulose acetate foil.

16. A process according to claim 9 in which the base is paper.

References Cited by the Examiner

UNITED STATES PATENTS

| | | | |
|---|---|---|---|
| 2,063,631 | 12/1936 | Schmidt et al. | 96—91 X |
| 2,100,063 | 11/1937 | Zahn | 96—91 X |
| 2,679,498 | 5/1954 | Seven et al. | 96—33 X |
| 2,810,341 | 10/1957 | Neugebauer et al. | 96—33 X |
| 3,235,382 | 2/1966 | Neugebauer et al. | 96—33 |

OTHER REFERENCES

Lange et al.: Deutche Chemische Berichte, vol. 63, 1930 pages 1058–1062 and 1067–1068.

Saunders: The Aromatic Diazo Compounds, Edward Arnold & Co., London, 2nd ed., 1949, pages 76–81.

NORMAN G. TORCHIN, *Primary Examiner.*

J. TRAVIS BROWN, *Examiner.*

R. L. STONE, C. BOWERS, *Assistant Examiners.*